United States Patent
Blumrich et al.

(10) Patent No.: US 7,669,012 B2
(45) Date of Patent: Feb. 23, 2010

(54) INSERTION OF COHERENCE REQUESTS FOR DEBUGGING A MULTIPROCESSOR

(75) Inventors: Matthias A. Blumrich, Ridgefield, CT (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 11/768,547

(22) Filed: Jun. 26, 2007

(65) Prior Publication Data

US 2009/0006764 A1    Jan. 1, 2009

(51) Int. Cl.
G06F 13/00    (2006.01)
G06F 13/28    (2006.01)

(52) U.S. Cl. .................................. 711/146; 711/141
(58) Field of Classification Search ............ None
See application file for complete search history.

*Primary Examiner*—Kevin Verbrugge
*Assistant Examiner*—Eric S Cardwell
(74) *Attorney, Agent, or Firm*—Scully, Scott, Murphy & Presser, P.C.; Daniel P. Morris, Esq.

(57) ABSTRACT

A method and system are disclosed to insert coherence events in a multiprocessor computer system, and to present those coherence events to the processors of the multiprocessor computer system for analysis and debugging purposes. The coherence events are inserted in the computer system by adding one or more special insert registers. By writing into the insert registers, coherence events are inserted in the multiprocessor system as if they were generated by the normal coherence protocol. Once these coherence events are processed, the processing of coherence events can continue in the normal operation mode.

20 Claims, 5 Drawing Sheets

INSERTION OF COHERENCE REQUESTS FOR DEBUGGING A MULTIPROCESSOR

GOVERNMENT RIGHTS

This invention was made with Government support under Contract No.: B554331, awarded by Department of Energy. The Government has certain rights to this invention.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC C,OUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

The present invention generally relates to multiprocessor computer systems.

2. Description of the Prior Art

To achieve high performance computing, multiple individual processors have been interconnected to form multiprocessor computer systems capable of parallel processing. Multiple processors can be placed on a single chip, or several chips—each containing one or several processors—interconnected into a multiprocessor computer system.

Processors in a multiprocessor computer system use private cache memories because of their short access time (a cache is local to a processor and provides fast access to data) and to reduce the number of memory requests to the main memory. However, managing caches in a multiprocessor system is complex. Multiple private caches introduce the multi-cache coherency problem (or stale data problem) due to multiple copies of main memory data that can concurrently exist in the caches of the multiprocessor system.

The protocols that maintain the coherence between multiple processors are called cache coherence protocols. Cache coherence protocols track any sharing of data blocks between the processors. For example, MESI is a common coherence protocol where every hardware cache line can be in one of four states: modified (M), exclusive (E), shared (S), or invalid (I). Line states are changed by memory references issued by the processors.

In a coherent multiprocessor system, a memory reference issued by one processor can affect the caches of other processors. For example, when a processor stores to a line, the coherence mechanism must ensure that eventually all caches either have the new data or have no data for that line at all. This generally involves a good deal of inter-processor communication for testing the state of the line in the various caches and changing the state, if necessary. Commonly, such interprocessor communication is conducted by passing packets containing coherence protocol actions and responses between processors, herein referred to as coherence events.

One group of cache coherence protocols is referred to as snooping. In a snooping cache coherence approach, no centralized system coherence state is kept, but rather each cache keeps the sharing status of data blocks locally. The caches are usually on a shared memory bus, and all cache controllers snoop (monitor) the bus to determine whether they have a copy of the data block requested. A commonly used snooping method is the "write-invalidate" protocol. In this protocol, a processor ensures that it has exclusive access to data before it writes that data. On each write, all processors snoop on the bus and check their caches to see if the address written to is also located in their caches. If so, the data corresponding to this address are invalidated. If two or more processors attempt to write the same data simultaneously, only one of them wins the race, causing the other processors' copies to be invalidated.

When a cache coherence event is not properly handled, which may occur for several reasons, an error is introduced in the system. This error may manifest itself much later in the processing, or not at all. Achieving proper handling of coherence events in a multiprocessor system is one of the biggest challenges in a multiprocessor design. Designers and programmers employ various techniques called debugging to determine the source or sources of any errors.

Sometimes, in debugging a multiprocessor system, it is advantageous to be able to control coherence traffic. It is desirable to be able to have control over coherence requests being presented to a processor to enable easier debugging of a multiprocessor coherence mechanism. It is desirable to be able to insert specific coherence events, whose behavior can be observed by examining the states of various memory elements after their processing.

U.S. Pat. No. 6,986,026 describes a technique for causing a single processor to process one instruction at a time. Processor single stepping is executed by taking an exception after each instruction or by invoking an emulator. That patent does not describe a technique for debugging a multiprocessor system, and does not describe how to debug coherence events.

Having set forth the limitations of the prior art, it is clear that what is required is a technique for debugging coherence event processing in a multiprocessor computer system.

SUMMARY OF THE INVENTION

It is therefore an object of the present invention to provide a simple technique and method for processing coherence requests presented to processors in cache coherent multiprocessor computer systems.

These and other objectives are attained with a method and system to insert specific coherence events in a multiprocessor computer system, and to present those coherence events to the processors of the multiprocessor computer system as if they were generated by the normal coherence protocol. These coherence events are inserted in the computer system by adding one or more special registers for this purpose. By writing into said special registers, specific coherence events are inserted into the multiprocessor system. To the processors, these inserted coherence events are indistinguishable from the normal events generated by the inter-processor coherence protocol. Once the inserted coherence events are processed, the processing of normal coherence events can continue in the execution mode.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
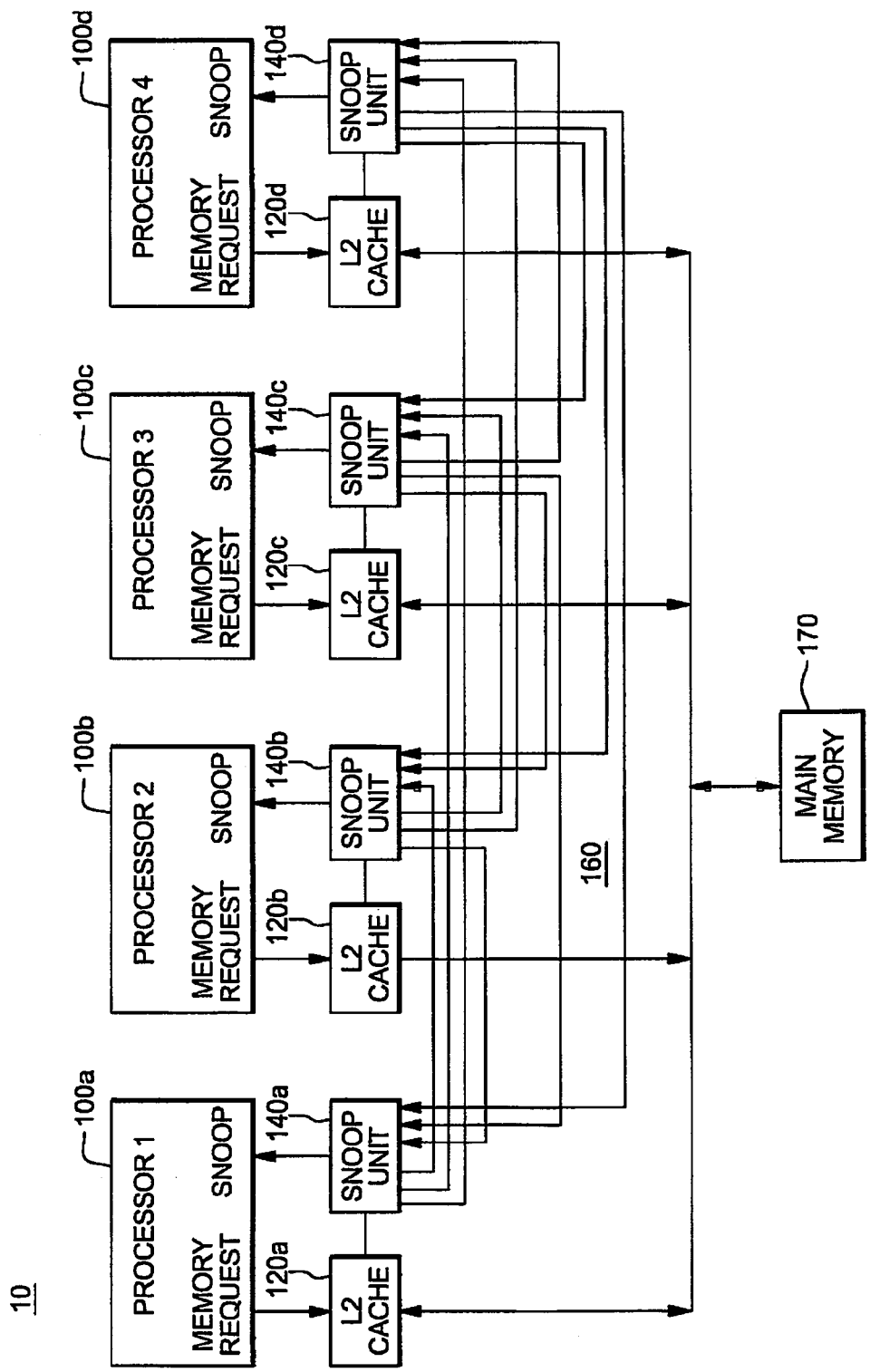
FIG. 1 depicts a base multiprocessor system using point-to-point interconnects for cache coherency.

Referring now to drawings, and more particularly to FIG. 1, there is shown the overall base architecture of the multiprocessor system 10 with the use of a snooping approach for cache coherency. In the preferred embodiment, the multiprocessor system is comprised of 4 processors 100a, . . . , 100d (or central processing units CPUs) with their local L1 data and instruction caches, and their associated L2 caches 120a, . . . , 120d. In the preferred embodiment, the processor cores 100a, . . . , 100d are identical, but any suitable combination of various processors in a single multiprocessor system can be used without departing from the scope of this invention. As will become apparent, the multiprocessor system 10 can be comprised of any feasible number of processors without departing from the scope of the invention.

To implement the memory coherence protocol, a snoop unit 140a, . . . , 140d is provided for each respective processor core 100a, . . . , 100d in the multiprocessor system 10. For transferring coherence events, the preferred embodiment implements a point-to-point interconnection, represented at 160, wherein each processor's associated snoop unit is directly connected with each snoop unit associated with every other processor in the system. It is to be understood that, without departing from the scope of the present invention, in another embodiment, a system bus can be used to interconnect the snoop units, or that a single or multiple ring interconnect can be used, or that a switch can be used, or that both memory and coherence traffic can share the same system interconnect, or that the memory and coherence traffic can be separated, as one skilled in the art will appreciate.

All coherence (e.g. invalidation) requests from a single processor are forwarded to that processor's snoop unit 140a, . . . , 140d by the associated L2 cache 120a, . . . , 120d, which then broadcasts them to the remote snoop units of other processors. The snoop unit receives all invalidation requests for that particular processor from remote snoop units and forwards them to the L1 cache within the processor. The snoop unit may optionally include one or more snoop filters that reduce the number of invalidations presented to the processor.

Figure 2:
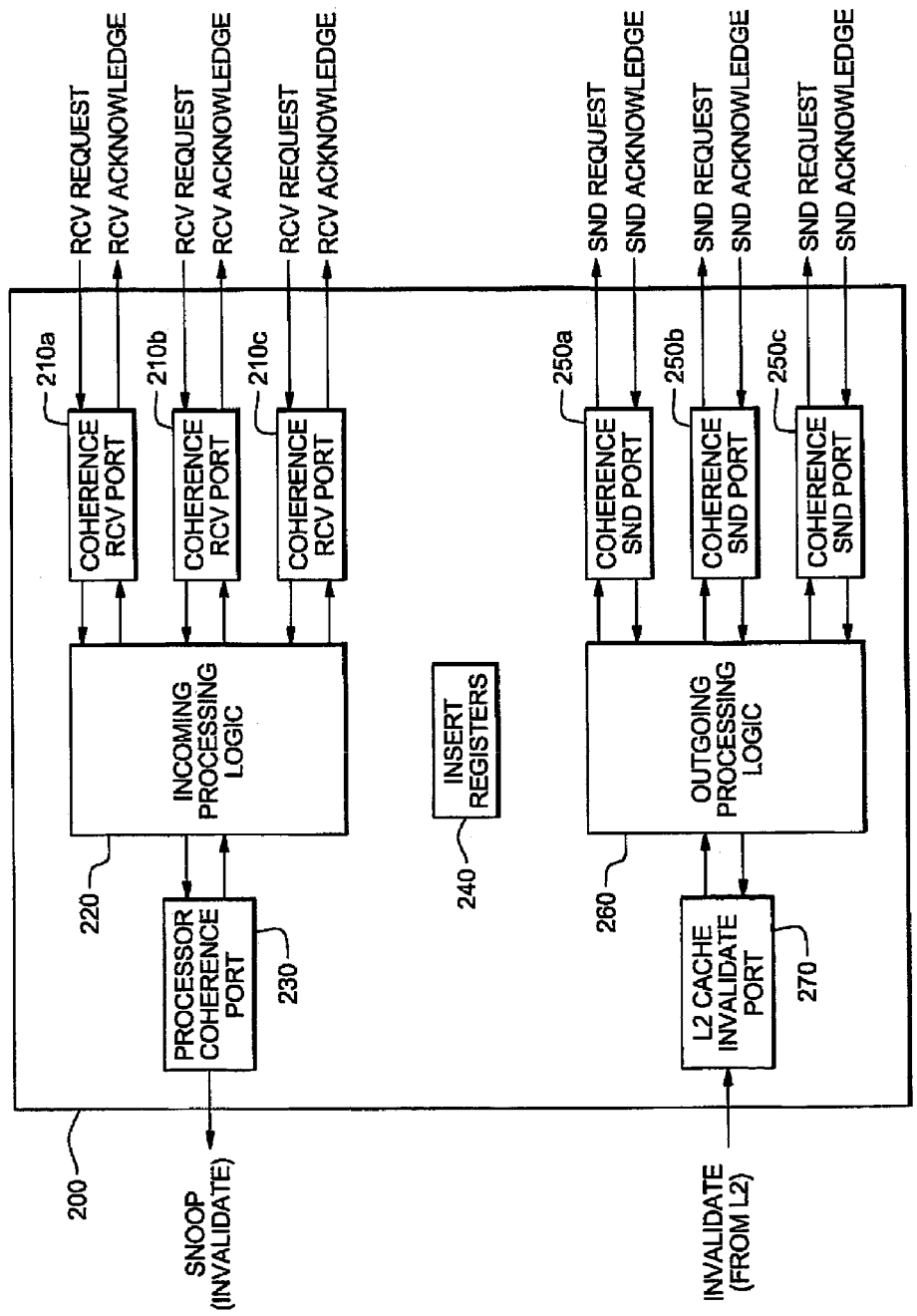
FIG. 2 depicts a base snoop unit according to the present invention.

Referring now to FIG. 2, a simplified schematic of a single snoop unit 200 associated with a processor 100 in the multiprocessor system of FIG. 1 is illustrated. As shown in FIG. 2, the snoop unit 200 includes multiple coherence rcv ports 210a, . . . , 210c that operate in parallel, with each port dedicated to only one source of 3 remote memory writers. Without departing from the scope of the invention, the snoop unit could include additional coherence rcv ports for additional memory writers such as a direct memory access (DMA) unit.

In operation, the incoming processing logic 220 processes the incoming coherence events received on coherence rcv ports 210, and forwards them in an orderly manner to the associated processor 100 via the processor coherence port 230. The incoming processing logic 220 may optionally include snoop filtering logic to eliminate coherence requests that are known to be useless. Each processor coherence rcv port 210 includes one or more snoop queues, where coherence events are stored until they are presented to the processor via the processor coherence port 230. The snoop unit 200 has one or more insert registers 240 which can be programmed under software control. Writing into the insert registers 240 will cause one or more coherence events to be inserted in the coherence protocol of the multiprocessor system.

The snoop unit 200 also includes outgoing processing logic 260 that receives invalidate requests from the L2 cache associated with the snoop unit 200 by way of the L2 cache invalidate port 270. The invalidate request processing logic is responsible for broadcasting invalidation requests to all remote snoop units using a point-to-point flow-control protocol such as a token-based scheme. The flow-control protocol is implemented in the coherence snd ports 250a, ..., 250c, each of which is connected to a single, remote coherence rcv port 210.

In the preferred embodiment, all coherence requests are received at the coherence rcv ports 210a, ..., 210c, having one processor port per remote memory writer. In another embodiment, there is only one coherence port shared between all memory writers. The serialization of the coherence writer's access to this single port is performed by the coherence traffic interconnect. In yet another embodiment, there are a limited number of coherence ports, where all of them or some of them are shared between one subgroup of memory writers, and some of the coherence ports may be dedicated to a single memory writer. It is to be understood that other configurations are also possible without departing from the scope of this invention.

Similarly, in the preferred embodiment, all received coherence events are processed in parallel in the incoming processing logic 220. In another embodiment, coherence events are processed sequentially, where serialization of coherence requests is performed either internally to the snoop unit 200, or external to it, or some combination of these. In yet another embodiment, some combination of serial and parallel processing of coherence events is implemented without departing from the scope of this invention.

In the preferred embodiment, coherence events are presented to the processor coherence port 230 in parallel. In another embodiment, there is only one processor coherence port, which presents coherence events to the processor sequentially. In yet another embodiment, some combination of serial and parallel presenting of coherence events to the processor is implemented without departing from the scope of this invention, as will be understood by those skilled in the art.

In some circumstances, it might be advantageous to have control over coherence events in a multiprocessor system. It might be advantageous to be able to insert desired coherence events such as invalidations, present these to the processor, and then examine the state of some memory elements, like registers, located in the processor, snoop unit, or anywhere else in the multiprocessor system. Controlled insertion of coherence events can be used to debug systems in order to understand if an error is induced by system software, applications, or hardware, and to identify that error. Debugging may take place during the system hardware and software development, or after the system is incorporated in a product.

In the preferred embodiment, each snoop unit 140 has one or more insert registers 240 for inserting coherence events. By writing into these insert registers, one or more coherence requests are inserted in the multiprocessor system 10.

In the preferred embodiment, the insert registers 240 are mapped in the memory address space, and are accessible and programmable by all the processors in the multiprocessor system 10. In another embodiment, the insert registers 240 are accessible and programmable by the associated processor 100 only. In yet another embodiment, the insert registers 240 are accessible and programmable via a special interface, which can be accessed from outside of the multiprocessor system 10. In yet another embodiment, the insert registers 240 can be accessed in more than one way, using some combination of the above specified methods, as will be understood by those skilled in the art.

Figure 3:
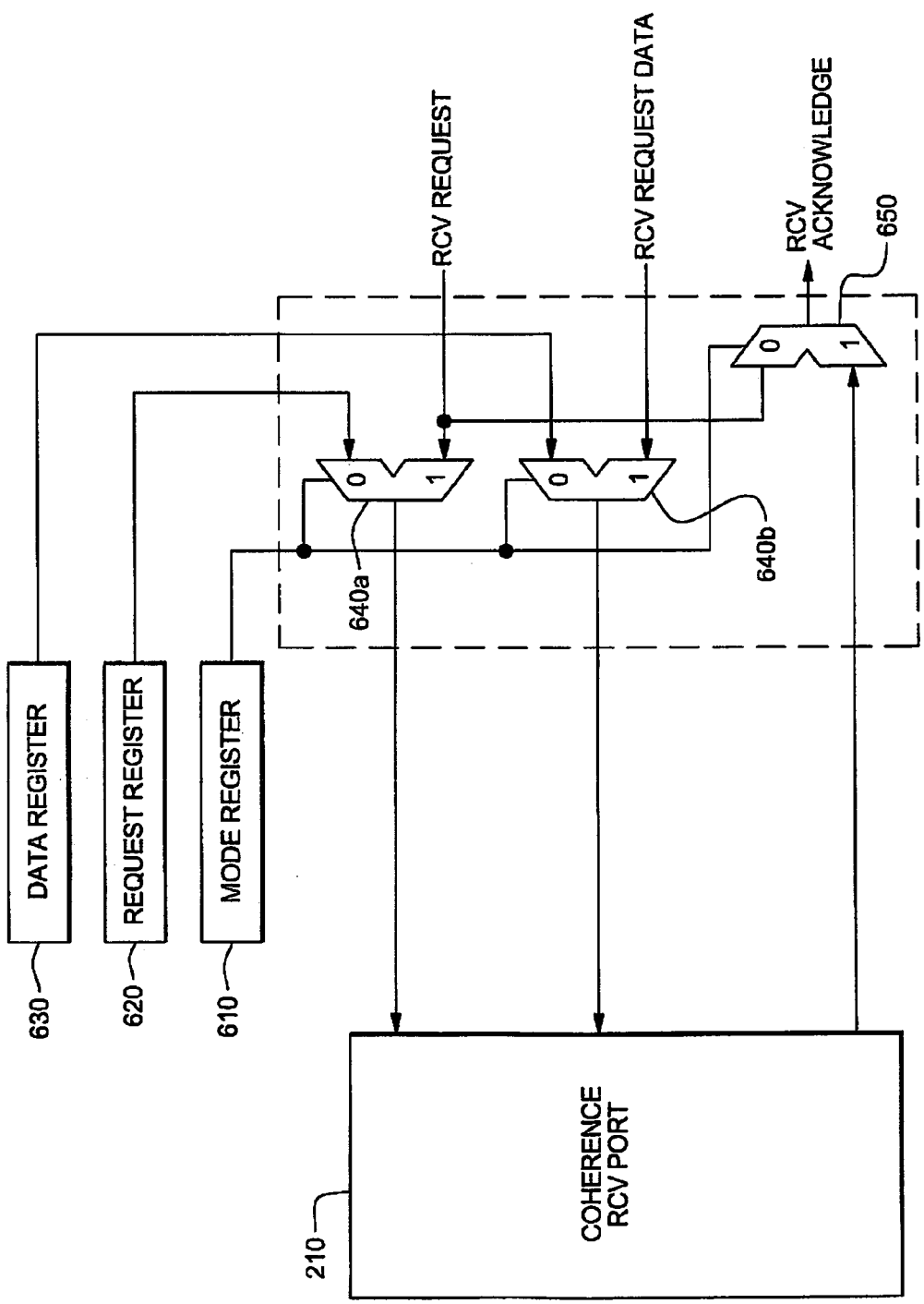
FIG. 3 depicts the logic of the preferred embodiment of the present invention.

In the preferred embodiment, invalidation requests are inserted into the incoming path of the snoop unit 140 at the very boundary of the unit, causing them to appear as if they were sent by a remote snoop unit 140. FIG. 3 shows detail of the preferred embodiment, where logic has been added before the coherence rcv port 210. In the normal mode of operation, the mode register 610 is programmed so that all three multiplexers 640a, 640b, 650 select their 1 inputs, causing the rcv_request and rcv_acknowledge signals to pass through.

In order to insert a specific invalidation request, the mode register 610 is programmed to switch to insert mode, which selects the 0 input of the multiplexers 640a, 640b, 650. This has two effects. First, it allows an invalidation request to be inserted by programming the contents of the request (address, etc.) into the data register 630 and then inserting it by writing a single control bit into the request register 620. The request register 620 is designed to process the request bit and provide a logic strobe that exactly mimics the rcv_request signal so that the coherence rcv port logic 210 remains unchanged.

The second effect of switching to insert mode is that the rcv_acknowledge handshaking signal is driven by the rcv_request signal through multiplexer 650 so that the link protocol is satisfied while actual remote requests are ignored. This behavior has nothing to do with the insertion of the invalidation coherence event, as will be understood by those skilled in the art. It demonstrates a possible method to deal with invalidation requests that might be received, but is not the only possibility, The logic can switch between normal operation mode and insert mode by re-programming the mode register 610.

In another embodiment, the data register 630 and request register 620 are replaced by first-in, first-out (FIFO) queues so that multiple coherence requests can be stored (not shown). In this embodiment, switching the mode register 610 from normal mode to insert mode would cause the enqueued requests to be applied to the coherence rcv port 210 sequentially. After that, additional coherence requests can be inserted in the same manner as the preferred embodiment while the mode register is set to select the insert mode. That is, the contents of an invalidation request are written to the data register FIFO and the request is inserted by a write to the request register FIFO.

As will be readily apparent to those skilled in the art, various implementations of the mode, data, and request registers are possible without departing from the scope of the invention. For example, a single register could be used, where bit-fields within that register define the mode, the coherence request to insert, and the trigger to insert it. Similarly, the FIFO embodiment could be realized with a mode register and a single FIFO that combines the data and request FIFOs.

The boundary of the snoop unit's incoming path is not the only place that a coherence event could be inserted. The arrows between major functional units in FIG. 2 represent the fact that each of these interfaces can be comprised of a request and acknowledge protocol similar to that used between snoop units. Therefore, in another embodiment, logic such as that shown in FIG. 3 could be inserted between the coherence rcv ports 210 and the incoming processing logic 220, or between the incoming processing logic 220 and the processor coherence port 230, or between the L2 cache invalidate port 270 and the outgoing processing logic 260, or between the outgoing processing logic 260 and the coherence snd port 250. Similarly, coherence protocol acknowledgements (which are also coherence events) could be inserted with logic such as that shown in FIG. 3. Those skilled in the art will recognize that inserting coherence events at some particular point allows the functionality of all logic between that point and some other point where the effect is monitored to be analyzed. For example, inserting invalidation requests as per the preferred embodiment in FIG. 3 and studying their effect on a processor's cache state allows all the logic of the incoming coherence path of the snoop unit to be analyzed. It can be seen that a designer could use this invention to add debugging and analysis capability to the coherence logic at various points.

Figure 4:
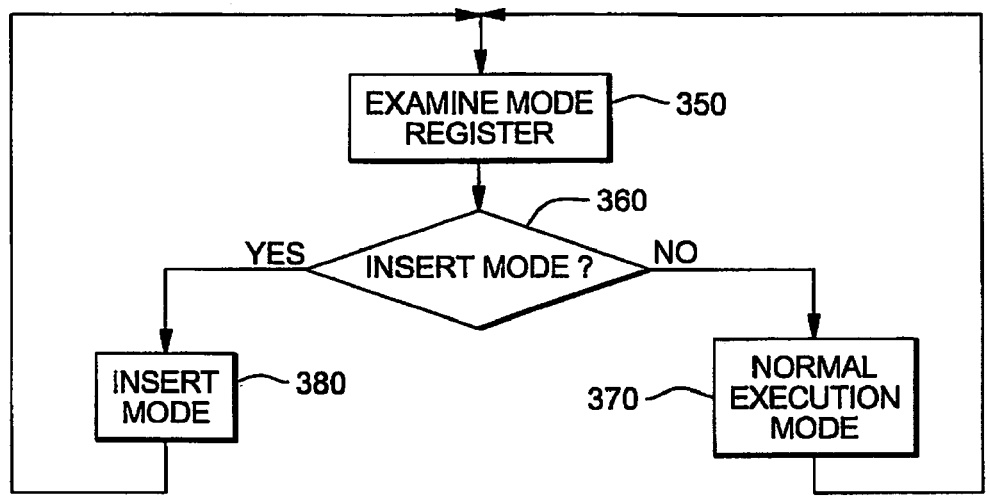
FIG. 4 depicts the control flow for the snoop unit to select the operation mode according to the present invention.

Referring now to FIG. 4, a control flow for the preferred embodiment of the invention is illustrated. In this embodiment, a mode register is contained within the registers 240 of the snoop unit 200. The mode register is continuously examined, as indicated at step 350. Within the mode register, there are one or more control bits. Depending on the value associated to these control bits, a different mode of operation is selected, as indicated at step 360.

If bits or a combination of several bits are set to select the execution mode, the control flow proceeds to step 370, and the processing of coherence events will proceed in a normal execution mode. If, however, bits or a combination of several bits are set to select the insert mode, the control flow proceeds to step 380 where the coherence event processing will proceed in the insert mode. While in normal execution or insert mode, control returns to step 350 where the mode register is again examined.

Figure 5:
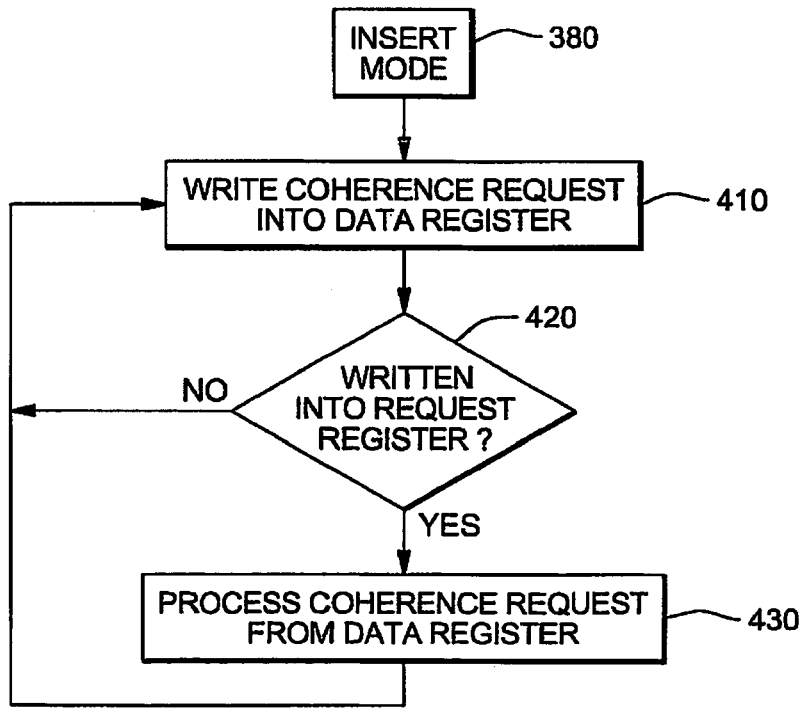
FIG. 5 depicts the control flow for the snoop unit to insert coherence events according to the present invention.

Referring now to FIG. 5, the control flow for the snoop unit operation in insert mode in accordance with the present invention is shown. Once the insert mode of operation is selected at step 380, the processing of coherence events continues in insert mode.

At step 410, a coherence event is written into the data register 630. A write to this register can be performed by the associated processor, by some other processor in the multiprocessor system, or external to the multiprocessor system. After this coherence event is written into the data register, the control continues to step 420.

At step 420, it is checked if a write to the request register 620 is performed. If no write to the request register is performed, the control loops back to step 410 to allow the data register to be overwritten. Writing into the request register causes control to continue to step 430. At step 430, the coherence event from the data register is presented to the processor. The control loops back to step 410, where a new value can be written to the data register.

Figure 6:
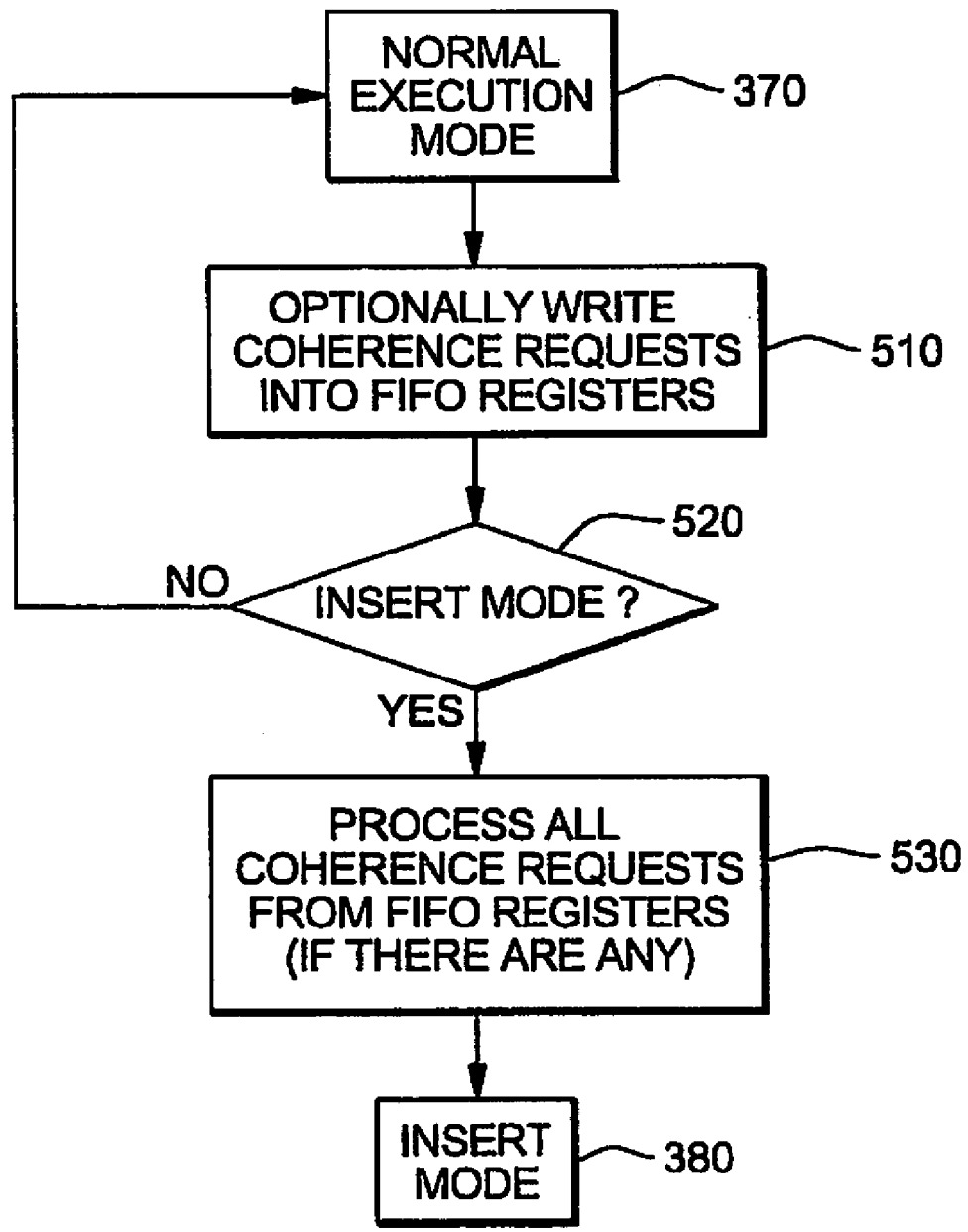
FIG. 6 depicts a control flow for the snoop unit to insert multiple coherence events in accordance with the present invention.

Referring now to FIG. 6, the control flow for an alternate embodiment of the present invention wherein the data and request registers are implemented as FIFO queues. Control begins in normal execution mode at step 370. At step 510, one or more coherence events are optionally written into the data FIFO while corresponding request bits are written into the request FIFO. At step 520, the mode register is tested to determine whether insert mode has been selected. If so, control proceeds to step 530 where all enqueued coherence events are processed sequentially, thereby draining the data and request FIFOs. After all enqueued events have been processed, control proceeds to step 380 where additional coherence events can be inserted as shown in FIG. 5.

If, at step 520, the insert mode is not selected, control remains in the normal execution mode at step 370, allowing more coherence events to be optionally written into the data and request FIFOs.

As will be readily apparent to those skilled in the art, the present invention or aspects of the invention can be realized in hardware, or as some combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method of inserting coherence events into a multiprocessor computer system, said system including a multitude of processing units, each of said processing units having a local cache, and a multitude of snoop units for supporting cache coherency in the multiprocessor computer system, the method comprising the steps of:
   providing each of the snoop units with a set of insert registers;
   storing a plurality of coherence events in the insert registers;
   presenting the coherence events to the processing units;
   the computer system processing said coherence events; and
   monitoring the computer system to determine the effect of said processing of said coherence events.

2. A method according to claim 1, wherein the insert registers are programmable by all of the processors in the multiprocessor computer system.

3. A method according to claim 1, wherein the insert registers are associated with a respective one of the processors in the multiprocessor computer system, and each of the insert registers is accessible and programmable by only the one of the processors associated with said each insert register.

4. A method according to claim 1, wherein the insert registers are accessible and programmable via an interface that is accessible from outside of the multiprocessor system.

5. A method according to claim 1, wherein the monitoring step includes the step of examining states of memory elements in the multiprocessor computer system.

6. A method according to claim 5, wherein said memory elements include registers located in the processors.

7. A method according to claim 1, wherein said system processing of coherence events includes snoop filtering of said coherence events.

8. A method according to claim 1, comprising the further step of determining if any of the processors writes into any of the insert registers.

9. A method according to claim 8, comprising the further steps of if no writes to the insert registers are performed, then processing coherence traffic in a regular execution mode, and the step of, if one of the processors writes into said one of the insert registers, then inserting into the multiprocessor computer system coherence events from said one of the insert registers.

10. A method according to claim 1, comprising the further steps of:
providing each of the snoop units with a mode control register;
storing a value in each of the mode control registers; and
based on the value stored in the mode control register of each snoop unit, operating said each snoop unit in either a normal execution mode or an insert mode.

11. A system for inserting coherence events into a multiprocessor computer system, said system including a multitude of processing units, each of said processing units having a local cache, and a multitude of snoop units for supporting cache coherency in the multiprocessor computer system, the system comprising:
a multitude of insert registers, each of the insert registers being located in a respective one of the snoop units, and wherein each of the insert registers stores one or more coherence events which are sent from the insert registers to the processing units;
the computer system which processes said coherence events; and
a monitor for monitoring the computer system to determine the effect of the coherence events.

12. A system according to claim 11, wherein the insert registers are programmable by all of the processors in the multiprocessor computer system.

13. A system according to claim 11, wherein each of the insert registers is accessible and programmable by only the processor unit having the snoop unit in which said each insert register is located.

14. A system according to claim 11, wherein the insert registers are accessible and programmable via an interface that is accessible from outside of the multiprocessor system.

15. A system according to claim 11, wherein if no writes are performed to the insert registers, then coherence traffic is processed in a regular execution mode; and if one of the processors writes into one of the insert registers, then coherence events are inserted into the multiprocessor computer system from said one of the insert registers.

16. A system according to claim 11, further comprising:
a multitude of mode control registers, each of the mode control registers being located in a respective one of the snoop units, and each of the mode control registers holding a value, and wherein each snoop unit operates in either a normal execution mode or an insert mode based on the value stored in the mode control register located in said each snoop unit.

17. A system according to claim 11, wherein said system to process coherence events in the multiprocessor computer system contains snoop filtering of coherence events.

18. A program storage device readable by machine, tangibly embodying a program of instructions executable by the machine to perform method steps for inserting coherence events into a multiprocessor computer system, said system including a multitude of processing units, each of said processing units having a local cache, and a multitude of snoop units for supporting cache coherency in the multiprocessor computer system, each of the snoop units having an associated insert register, said method steps comprising:
storing one or more coherence events in each of the insert registers;
at defined times, sending one of the coherence events from one of the insert registers to one of the processing units; and
monitoring the computer system to determine the effect of said coherence event.

19. A program storage device according to claim 18, wherein the insert registers are accessible and programmable via an interface that is accessible from outside of the multiprocessor system.

20. A program storage device according to claim 18, wherein said method steps further comprising if no writes to the insert registers are performed, then processing coherence traffic in a regular execution mode, and wherein the sending step includes the step of, if one of the processors writes into said one of the insert registers, then inserting into the multiprocessor computer system coherence events from said one of the insert registers.

* * * * *